Oct. 29, 1968  P. T. HULING  3,408,084
PRECISION SEAL FOR A ROTATING SHAFT
Filed Oct. 28, 1966
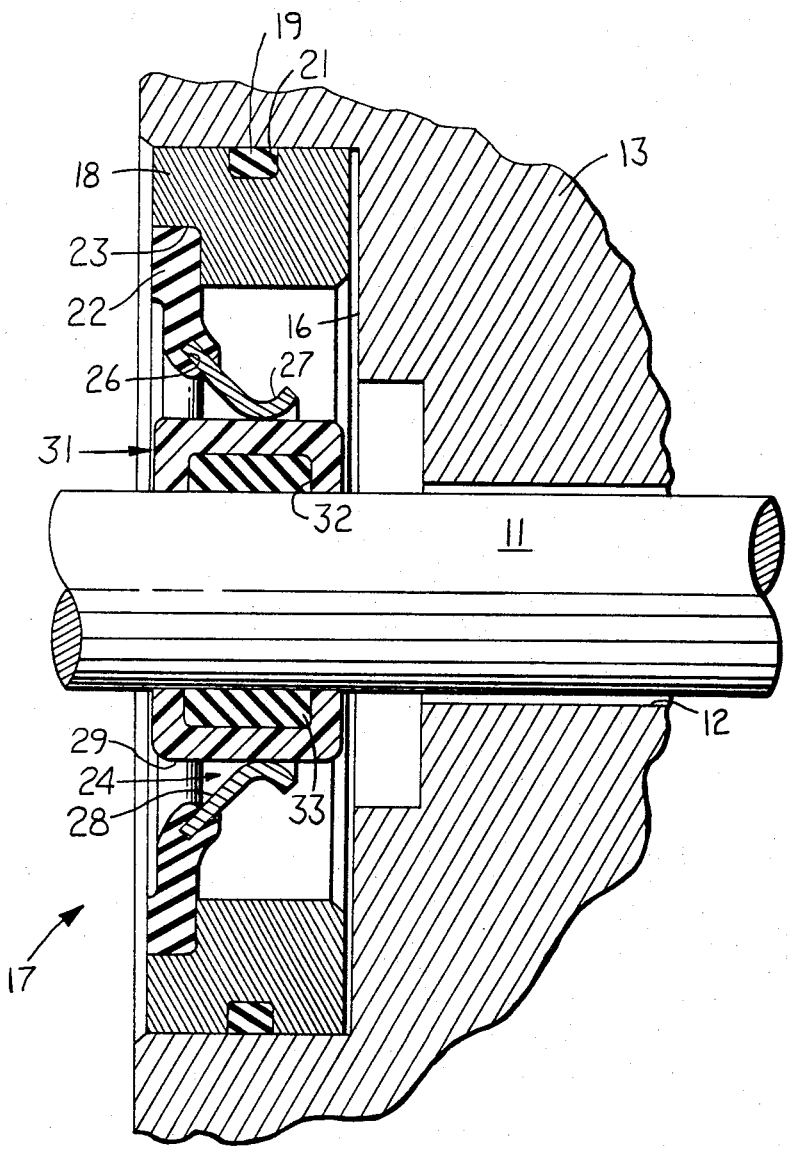
INVENTOR.
Paul T. Huling
BY
ATTORNEYS

United States Patent Office

3,408,084
Patented Oct. 29, 1968

3,408,084
PRECISION SEAL FOR A ROTATING SHAFT
Paul T. Huling, Plainfield, Ill., assignor to Caterpillar Tractor Co., Peoria, Ill., a corporation of California
Filed Oct. 28, 1966, Ser. No. 590,279
8 Claims. (Cl. 277—37)

This invention relates to seals for disposition between a rotating shaft and adjacent structure and more specifically to a seal particularly effective for use in conjunction with a rotary shaft which may be subject to small axial or radial movements.

A class of seal which is extensively used in conjunction with rotating elements is the lip-type in which a flexible annular element encircles the rotary shaft and is secured to circumjacent stationary structure. The flexible element is formed of a resilient material such as rubber or is backed by a spring, or both, so that one edge bears forcibly against the shaft to provide the desired seal. In some instances a wear sleeve is secured to the shaft in coaxial relationship thereon to define the contact surface against which the lip bears.

While seals of this general class have many desirable properties, including the ability to maintain a seal where the shaft is subject to some radial runout or small movements at right angles to the axis of rotation, such seals as heretofore constructed have not been fully satisfactory in several important respects.

To provide an adequate seal, the flexible element or lip must exert a substantial force against the rotating shaft either through its inherent resiliency or through the action of the associated spring. The resulting friction is not only undesirable in itself but is productive of rapid wear and overheating. Further, prior lip seal designs require that a precision finished surface be provided on the shaft. While the seals may absorb some radial runout as discussed above, performance in this respect is limited and there may be little or no tolerance of axial shaft movement.

A very significant characteristic of prior lip seal constructions is a lack of adaptability to the use of certain preferred materials which have very desirable properties for sealing purposes. A representative material of this type, characterized by a very low coefficient of friction, durability and excellent heat resistance, is polytetrafluoroethylene resin sold commercially under the trade name "Teflon."

Seals of Teflon backed with a suitable resilient material have been successfully used in conjunction with reciprocating shafts but have not, in prior seal constructions, been satisfactory for use with rotary shafts particularly where radial runout is encountered. Seals of such material require a relatively close fit and the area of contact and lip pressure must be maintained fairly constant in use. These requirements are seemingly incompatible with use at a shaft where radial runout eccentricity, which may be combined with axial movement, is probable. In addition to deleteriously affecting the sealing properties of the structure, such movements tend to cause localized wear thereby shortening the life of the seal.

Accordingly a need exists for a seal construction which provides the desirable characteristics of preferred materials while being insensitive to small radial or axial movements of the rotating shaft, which eliminates the need for precision finishing of the shaft, and which is durable and free from excessive friction under all operating conditions.

The present invention meets these criteria in a construction which differs from the conventional lip seal in a very significant respect. In the conventional seal, the pressure needed to maintain the sealing contact is exerted by, or through, the lip which is generally formed of elastic material. Such pressure is exerted by the lip against a rigid annular surface on the rotating shaft. In the present invention, a reverse condition obtains. The lip is formed of rigid material and the pressure needed to maintain the sealing contact is exerted through the rotating annular surface which the lip contacts. Owing to its rigidity, the lip cannot lift from the contact area under any condition, however it is itself supported by flexible means to accommodate radial movement of the structure as a whole.

The area on the rotating shaft which is contacted by the rigid lip may be defined by a sleeve formed of a preferred seal material such as Teflon. The sleeve may have a filling of compressed elastomeric material which applies the pressure necessary to maintain the sealing contact with the rigid lip.

Accordingly it is an object of this invention to provide a more versatile and durable low friction seal for use at a rotating shaft.

It is another object of this invention to provide a rotary seal of the lip type which maintains an optimum relationship between the lip and the surface contacted thereby under varied operating conditions.

It is still another object of the invention to provide a precision seal for use with a rotating shaft which is relatively insensitive to radial and axial movements of the shaft.

A further object of the invention is to provide a seal which does not require precision finishing of rotating members which are to be sealed.

Still a further object of this invention is to provide a seal of the lip type adaptable to the use of materials having preferred properties for sealing functions.

It is another object of this invention to provide a rotary seal of the lip type which will not lift off the shaft due to centrifugal force, when conditions are such that the housing is the rotating member.

The invention, together with further objects and advantages thereof, will best be understood by reference to the following specification in conjunction with the accompanying drawing which is an axial section view of a seal embodying the invention shown disposed between a rotating shaft and a stationary housing through which the shaft extends.

Referring now to the drawing, many diverse types of apparatus have a rotatable shaft 11 extending through a bore 12 in a stationary housing 13 under conditions where it is desired to provide a seal between the two members. The seal may be needed to retain liquid or semi-solid lubricants in the bore 12, to prevent the passage of dust or contamination along the bore 12, or for other similar purposes. Such structures usually have a cylindrical recess 16 in one side of the housing 13 which is centered with respect to the shaft 11 to receive a seal assembly such as assembly 17 of the present invention.

Seal assembly 17 has a rigid outer ring 18 which may be press fitted into the recess 16 of the stationary housing 13 in coaxial relationship to the rotating shaft 11. To form a seal between the housing 13 and outer ring 18, a resilient sealing element 19 is disposed in a groove 21 around the outer surface of the ring. Outer ring 18 has an inside diameter substantially greater than the thickness of the rotating shaft 11 to provide space for intervening elements of the seal assembly 17 as will hereinafter be described.

Outer ring 18 supports an annular diaphragm 22 formed of elastomeric material such as rubber. Diaphragm 22 fits into an annular shelf 23 in the outer ring 18 and extends therefrom in the direction of the rotating shaft 11, the diaphragm being bonded to the outer ring.

The lip or sealing element in this construction is formed by a rigid ring 24 carried by the flexible diaphragm 22. The radially outermost edge of lip ring 24 is received in a groove 26 around the inner edge of diaphragm 22 and is bonded thereto so that the lip ring 24, diaphragm 22 and outer ring 18 form a unitary assembly with the lip ring being movable to a limited extent relative to the outer ring. Lip ring 24 extends from diaphragm 22 towards the rotatable shaft 11 and has a radially innermost end 27 which is of arcuate profile with the convex side facing the shaft 11 and being radially spaced therefrom. The portion 28 of lip ring 24 between the diaphragm 22 and the inner end 27 of the ring is of conical configuration so that the inner end is situated closer to the bore 12 than the diaphragm. Lip ring 24 is formed of a corrosion resistant metal such as stainless steel.

Inasmuch as the lip ring 24 is rigid, it cannot by itself exert a uniform radial pressure against a revolving surface to form a sealing contact as in a conventional lip ring seal. An important aspect of the present invention is that the radial pressure necessary to form the seal arises from the surface against which the lip ring 24 bears rather than from the lip ring itself. Such surface 29, in this embodiment of the invention, is defined by an annular slipper ring 31 disposed coaxially on the rotatable shaft 11 within the slip ring 24. Slipper ring 31 has a groove 32 at the side adjacent shaft 11 which is filled by an additional ring 33 of elastomeric material such as rubber. The several elements are proportioned so that emplacement of the lip ring 24 on the slipper ring 31 acts to compress the inner elastic filler ring 33. Thus throughout the life of the seal, the elastic filler ring 33 exerts a radially expansive force against the slipper ring 31 causing the outer surface 29 thereof to bear forcibly against the inner end 27 of the lip ring thereby maintaining a sealing contact therewith.

Elastic filler 33 serves the further purposes of forming a fluid tight seal between the rotatable shaft 11 and slipper ring 31 and of locking the slipper ring to the rotatable shaft by friction so that it turns therewith.

Where the shaft 11 may be subject to longitudinal movements the slipper ring 31 and the elastic filler ring 33 contained therein are made as long in the axial direction as might be necessary to maintain the contact with lip ring 24 while the shaft undergoes such movements.

In order to fully realize all the advantages of this construction, the slipper ring 31 is formed of a wear resistant plastic material of the class having a low coefficient of friction and which is capable of cold flow. As hereinbefore discussed, Teflon is an example of such a material.

In operation, the slipper ring 31 rotates with shaft 11 while the lip ring 24 is held relatively stationary through its connection to housing 13 through diaphragm 22 and outer ring 18. The sealing area is defined by the annular zone of contact between slipper ring surface 29 and the inner end 27 of lip ring 24, with the necessary radial pressure for maintaining the seal being provided by the compressed elastic material 33 within the slipper ring. Owing to the relative rigidity of the lip ring 24, there are no conditions under which the lip or any limited angular portion thereof can lift from the slipper ring and destroy the sealing relationship therebetween as occurs in prior forms of lip seal. This conditions holds true irrespective of limited radial or longitudinal movements of the rotatable shaft 11 and irrespective of any eccentricity thereof.

While the seal assembly 17 has been herein described in the more common situation where a seal is to be formed between a rotatable shaft 11 and a stationary housing 13, it will be apparent that it is equally useful in situations where both members rotate but at a differential rate or direction. Many variations are possible within the scope of the invention and it is not intended to limit the invention except as defined in the following claims.

What is claimed is:

1. A seal for disposition between a shaft and circumjacent structure wherein said shaft rotates relative to said structure, comprising, in combination, a first ring disposed coaxially on said shaft for rotation therewith, said first ring having an outer surface characterized by a low coefficient of friction and which is compressible in a radial direction and having resilient means exerting a counterforce against such compression, a second ring formed of rigid material encircling said first ring and having an annular lip portion contacting said first ring in an annular zone extending around the outer surface thereof and maintaining said first ring under radial compression, and a flexible resilient elastomeric annular fluid-tight element attaching said second ring to said circumjacent structure.

2. A seal as defined in claim 1 wherein said flexible annular element which attaches said second ring to said circumjacent structure is an elastic diaphragm extending radially with respect to said shaft and having a radially innermost edge bonded to said second ring.

3. A seal as defined in claim 2 wherein said second ring has a conical portion extending from said diaphragm toward said first ring and has a radially innermost portion of arcuate profile with the convex side contacting said first ring.

4. A seal as defined in claim 2 wherein said circumjacent structure has a cylindrical cavity coaxial with said shaft for receiving said seal and further comprising a rigid third outer ring fittable into said cavity and having the radially outermost portion of said diaphragm bonded thereto.

5. A seal as defined in claim 1 wherein said first ring is formed by a shell of yieldable material having a groove adjacent said shaft, and wherein said resilient means is a filling of resilient material in said groove.

6. A seal as defined in claim 6 wherein said groove is of rectangular profile and said elastic filling is an annular volume of rubber disposed therein and conforming thereto whereby in addition to exerting said counterforce against compression of said first ring said rubber volume secures said first ring to said shaft by friction and forms a fluid tight seal therebetween.

7. A seal as defined in claim 1 wherein at least said outer surface of said first ring is formed of polytetrafluoroethylene resin.

8. A seal as defined in claim 1 wherein said first ring has a length in the axial direction at least equal to the extent of longitudinal movement of said shaft in the course of operation thereof.

References Cited

UNITED STATES PATENTS

| | | | |
|---|---|---|---|
| 3,021,161 | 2/1962 | Rhoads et al. | 277—37 |
| 3,099,454 | 7/1963 | Walinski | 277—152 X |
| 3,114,558 | 12/1963 | Rhoads et al. | 277—37 |
| 3,135,518 | 6/1964 | Carson et al. | 277—37 |
| 3,214,180 | 10/1965 | Hudson et al. | 277—37 |

SAMUEL ROTHBERG, *Primary Examiner.*